(12) United States Patent
Kim et al.

(10) Patent No.: US 9,076,250 B2
(45) Date of Patent: Jul. 7, 2015

(54) APPARATUS FOR 3D RECONSTRUCTION BASED ON MULTIPLE GPUS AND METHOD THEREOF

(71) Applicant: Electronics and Telecommunications Research Institute, Daejeon (KR)

(72) Inventors: Young Hee Kim, Daejeon (KR); Ki Hong Kim, Daejeon (KR); Jin Ho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 98 days.

(21) Appl. No.: 13/939,313

(22) Filed: Jul. 11, 2013

(65) Prior Publication Data

US 2014/0146057 A1     May 29, 2014

(30) Foreign Application Priority Data

Nov. 26, 2012    (KR) .................. 10-2012-0134288

(51) Int. Cl.
| | |
|---|---|
| *G06F 15/16* | (2006.01) |
| *G06T 15/00* | (2011.01) |
| *G06T 17/00* | (2006.01) |
| *G06T 7/00* | (2006.01) |

(52) U.S. Cl.
CPC ............... *G06T 17/00* (2013.01); *G06T 7/0024* (2013.01); *G06T 7/0051* (2013.01); *G06T 2200/28* (2013.01); *G06T 2207/10028* (2013.01)

(58) Field of Classification Search
CPC .................. G06F 15/00; G06F 15/16–15/161; G06F 3/14; G06T 1/00; G06T 1/0092; G06T 15/00–15/005; G06T 15/10; G09G 5/363; G09G 5/393

USPC .................................. 345/419, 501, 502, 504
See application file for complete search history.

(56) References Cited

U.S. PATENT DOCUMENTS

| | | | | |
|---|---|---|---|---|
| 7,289,125 | B2* | 10/2007 | Diard et al. | 345/501 |
| 7,372,465 | B1* | 5/2008 | Tamasi et al. | 345/502 |
| 2012/0306876 | A1* | 12/2012 | Shotton et al. | 345/424 |

FOREIGN PATENT DOCUMENTS

KR    10-2011-0099431 A    9/2011

OTHER PUBLICATIONS

Engelhard, et al. "Real-time 3D visual SLAM with a hand-held RGB-D camera." *Proc. of the RGB-D Workshop on 3D Perception in Robotics at the European Robotics Forum*, vol. 2011, 2011. (2 pages).
Newcombe, et al. "KinectFusion: Real-time dense surface mapping and tracking." *10th IEEE international symposium on Mixed and augmented reality (ISMAR)*, IEEE, 2011. (10 pages).

* cited by examiner

*Primary Examiner* — Jacinta M Crawford
(74) *Attorney, Agent, or Firm* — NSIP Law

(57) ABSTRACT

An apparatus for 3D reconstruction based on multiple GPUs and a method thereof are disclosed. The 3D reconstruction apparatus according to the present invention includes a 3D reconstruction apparatus, comprising: a camera configured to generate depth data for 3D space; a first GPU configured to update first TSDF volume data with first depth data generated for a first area and predict a surface point of an object which is present in the space from the first updated TSDF volume data; a second GPU configured to update second TSDF volume data with second depth data generated for a second area and predict a surface point of an object which is present in the space from the second updated TSDF volume data; and a master GPU configured to combine a surface point predicted from the first TSDF volume data and a surface point estimated from the second TSDF volume data.

16 Claims, 8 Drawing Sheets

APPARATUS FOR 3D RECONSTRUCTION BASED ON MULTIPLE GPUS AND METHOD THEREOF

CROSS-REFERENCE TO RELATED APPLICATIONS

This application claims priority to and the benefit of Korean Patent Application No. 10-2012-0134288 filed in the Korean Intellectual Property Office on Nov. 26, 2012, the entire contents of which are incorporated herein by reference.

TECHNICAL FIELD

The present invention relates to a 3D space reconstruction method, and specifically, to an apparatus for 3D reconstruction based on multiple GPUs including a plurality of GPUs (graphic processing unit) which reconstructs different areas, respectively and dynamically changes the areas to be reconstructed in accordance with the movement of a camera and a method thereof.

BACKGROUND ART

Recently, a low priced RGB-D sensor or camera such as Kinect by Microsoft is generally used. Therefore, a method (monocular camera tracking) which tracks a movement of the camera in real time using a monocular camera by a SFM (structure from motion) or a monocular SLAM (simultaneous localization and mapping) method which uses the above-mentioned sensor is actively being studied.

Recently, an algorithm called KinectFusion which three-dimensionally reconstructs an indoor environment in real time while a user moves with a Kinect camera has been announced. One of restrictive conditions of this method is that the reconstruction is performed only on an area determined before driving a system. Generally, the reconstruction is performed on a medium size room. The KinectFusion method represents an area to be reconstructed as volume data which is known as a TSDF (truncated signed distance function) and the volume data stores a distance to a close surface.

The KinectFusion method is used only for adjacent data in each step of the algorithm. However, the KinectFusion method reconstructs only an area determined before driving the system so that there is a limitation to expand a range of an area to be reconstructed.

SUMMARY

The present invention has been made in an effort to provide an apparatus for 3D reconstruction based on multiple GPUs including a plurality of GPUs (graphic processing unit) which reconstructs different areas, respectively, and dynamically changes the areas to be reconstructed in accordance with the movement of a camera and a method thereof.

However, an object of the present invention is not limited to the above description and other objects which have not been mentioned above will be more apparent to those skilled in the art from a reading of the following description.

A 3D reconstruction apparatus according to an aspect of the present invention may include a camera configured to generate depth data for 3D space to be reconstructed; a first GPU configured to update first TSDF volume data with first depth data generated for a first area and predict a surface point of an object which is present in a space from the first updated TSDF volume data; a second GPU configured to update second TSDF volume data with second depth data generated for a second area and predict a surface point of an object which is present in the space from the second updated TSDF volume data; and a master GPU configured to, if the first TSDF volume data and the second TSDF volume data are completely updated in accordance with the position of the camera, combine a surface point predicted from the first TSDF volume data and a surface point predicted from the second TSDF volume data.

The master GPU may receive first depth data generated from the camera for the first area and second depth data generated from the camera for the second area and calculate a vertex map and a normal map from the received first and second depth data to estimate a position of the camera based on the calculated vertex map and normal map.

The first GPU may update the first TSDF volume data with the first depth data based on the estimated position of the camera, and predict a surface point of an object which is present in a space from the first updated TSDF volume data using a ray casting algorithm.

The second GPU may update the second TSDF volume data with the second depth data based on the estimated position of the camera and predict a surface point of an object which is present in a space from the second updated TSDF volume data using a ray casting algorithm.

The first GPU may extract point cloud data corresponding to the surface coordinate of the object which is present in the space from the first TSDF volume data to which the combined result is applied.

The second GPU extracts point cloud data corresponding to the surface coordinate of the object which is present in the space from the second TSDF volume data to which the combined result is applied.

If the TSDF volume data of the first area which is processed by the first GPU is smaller than TSDF volume data of a third area which is not processed by the first GPU, the master GPU controls the first GPU to process the third area.

A 3D reconstruction method according to another aspect of the invention may include generating depth data for 3D space to be reconstructed by a camera; allowing a first GPU to update first TSDF volume data with first depth data generated for a first area and predict a surface point of an object which is present in the space from the first updated TSDF volume data; allowing a second GPU to update second TSDF volume data with second depth data generated for a second area and predict a surface point of an object which is present in the space from the second updated TSDF volume data; and allowing a master GPU to, if the first TSDF volume data and the second TSDF volume data are completely updated in accordance with the position of the camera, combine a surface point predicted from the first TSDF volume data and a surface point predicted from the second TSDF volume data.

The 3D reconstruction method may further include allowing the master GPU to receive first depth data generated from the camera for the first area and second depth data generated from the camera for the second area; allowing the master GPU to calculate a vertex map and a normal map from the received first and second depth data; and estimating a position of the camera based on the calculated vertex map and normal map.

The predicting by the first GPU may update the first TSDF volume data with the first depth data based on the estimated position of the camera and predict a surface point of an object which is present in a space from the first updated TSDF volume data using a ray casting algorithm.

The predicting by the second GPU may update the second TSDF volume data with the second depth data based on the predicted position of the camera and predict a surface point of an object which is present in a space from the first updated TSDF volume data using a ray casting algorithm.

The 3D reconstruction method may further include allowing the first GPU to extract point cloud data corresponding to the surface coordinate of the object which is present in the space from the first TSDF volume data to which the combined result is applied.

The 3D reconstruction method may further include allowing the second GPU to extract point cloud data corresponding to the surface coordinate of the object which is present in the space from the second TSDF volume data to which the combined result is applied.

The predicting by the first GPU may include if the TSDF volume data of the first area which is processed by the first GPU is smaller than TSDF volume data of a third area which is not processed by the first GPU, allowing the master GPU to control the first GPU to process the third area.

Therefore, the present invention includes a plurality of GPUs which reconstructs different areas, respectively and dynamically changes the areas to be reconstructed in accordance with the movement of a camera to expand a reconstructable area.

Further, the present invention includes a plurality of GPUs which reconstructs different areas, respectively and dynamically changes the areas to be reconstructed in accordance with the movement of a camera to eliminate a limitation for a reconstructable area.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
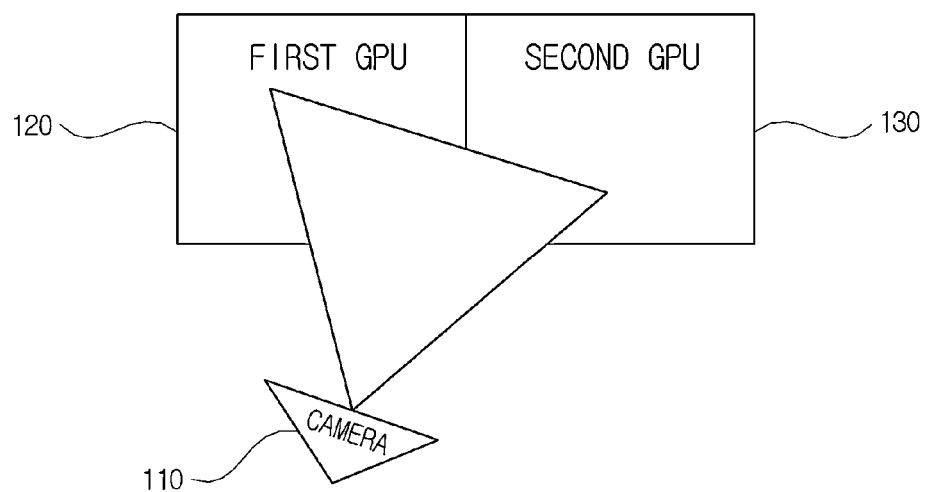
FIG. 1 is a first view illustrating an apparatus for 3D reconstruction according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an apparatus for 3D reconstruction based on multiple GPUs according to an exemplary embodiment of the present invention and a method therefor will be described with reference to FIGS. 1 to 7. Parts which are required to understand an operation and an effect of the present invention will be mainly described in detail.

In the description of components of an exemplary embodiment, a component having the same name may be denoted by a different reference numeral in some drawings but may be denoted by the same reference numeral even in different drawings. However, even in this case, it does not mean that the component has different functions depending on the exemplary embodiment or the components have the same function in the different exemplary embodiments but the function of each of the components may be determined based on the description of the components in the corresponding exemplary embodiment.

The present invention suggests a new 3D space reconstruction method which provides a plurality of GPUs (graphics processing unit) to reconstruct different areas and dynamically change an area to be reconstructed in accordance with the movement of the camera.

FIG. 1 is a first view illustrating an apparatus for 3D reconstruction according to an exemplary embodiment of the present invention.

As illustrated in FIG. 1, the apparatus for 3D reconstruction according to the exemplary embodiment of the present invention includes a camera 110, a first GPU 120, and a second GPU 130. Here, a 3D reconstruction method based on two GPUs will be described.

The camera 110 is an RGBD camera and generates depth data with respect to a space.

The first GPU 120 receives first depth data generated from the camera 110 for a first area and calculates a vertex map and a normal map from the received first depth data.

The first GPU 120 estimates a position of the camera using an ICP (iterative closest point) alignment method based on the calculated vertex map and normal map and generates or updates first TSDF (truncated signed distance function) volume data using the first depth data based on the estimated position of the camera. The position of the camera may be varied between continuous frames so that the position of the camera is estimated.

The first GPU 120 predicts a surface point of an object which is present in a current space from the first updated TSDF volume data using a ray casting algorithm.

In this case, the first GPU 120 updates the first TSDF volume data in accordance with the all positions of the camera and if the update is completed, combines a surface point predicted from the first updated TSDF volume data and a surface point estimated from second TSDF volume data.

The first GPU 120 extracts point cloud data corresponding to the surface coordinate of the object which is present in the space from the first TSDF volume data to which the combined result is applied.

The second GPU 130 receives second depth data generated from the camera 110 for a second area and calculates a vertex map and a normal map from the received second depth data. The second GPU 130 estimates a position of the camera using an ICP (iterative closest point) alignment method based on the calculated vertex map and normal map and generates or updates second TSDF (truncated signed distance function) volume data using the second depth data based on the estimated position of the camera.

The second GPU 130 predicts a surface point of the object which is present in the current space from the second updated TSDF volume data using the ray casting algorithm.

In this case, the second GPU 130 updates the second TSDF volume data in accordance with the all positions of the camera and if the update is completed, provides the surface point predicted from the second TSDF volume data to the first GPU 120.

The second GPU 130 extracts point cloud data corresponding to the surface coordinate of the object which is present in the space from the second TSDF volume data to which the combined result is applied.

Figure 2:
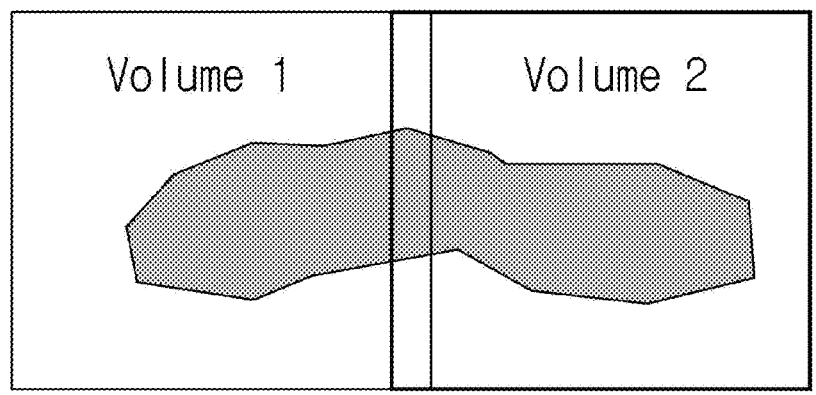
FIG. 2 is a view explaining a principle which sets TSDF volume data according to the exemplary embodiment of the present invention.

FIG. 2 is a view explaining a principle which sets TSDF volume data according to the exemplary embodiment of the present invention.

As illustrated in FIG. 2, the first GPU 120 and the second GPU 130 of the exemplary embodiment process data in different areas in the space. For example, the first GPU 120 processes data in the first area and the second GPU 130 processes data in the second area.

In this case, the first area and the second area may be set to have an overlaid area as much as a width of one voxel. Therefore, it does not need to exchange data between two GPUs. Here, the voxel indicates graph information at one end which defines one point in a 3D space.

Figure 3:
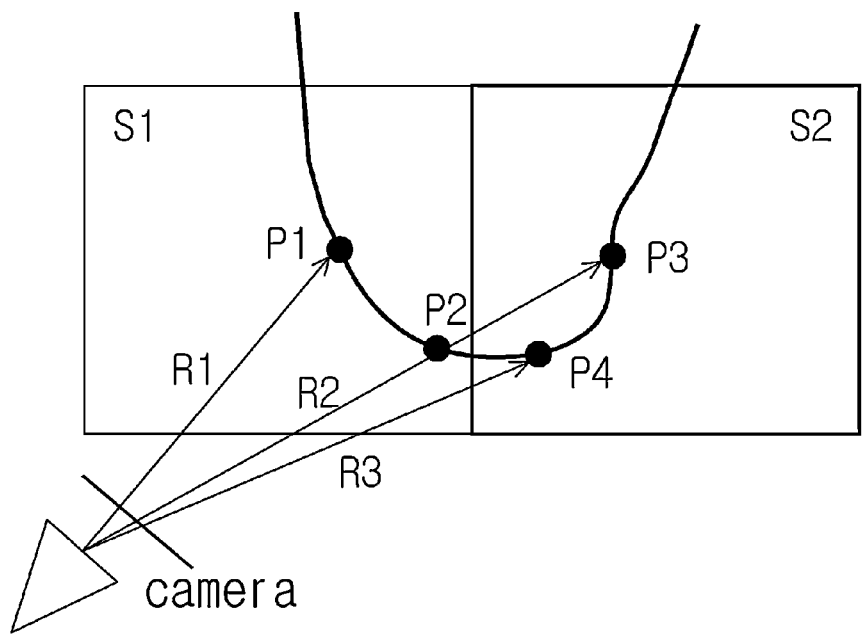
FIG. 3 is a view explaining a principle which combines prediction surfaces according to the exemplary embodiment.

FIG. 3 is a view explaining a principle which combines prediction surfaces according to the exemplary embodiment.

As illustrated in FIG. 3, the surface points predicted in the first GPU 120 and the second GPU 130 of the exemplary embodiment may be combined. For example, a point P1 is selected for a ray R1, a point P4 is selected for a ray R3. Points P2 and P3 are present for a ray R2 and the point P2 which is closer to the camera between the points P2 and P3 is selected.

Figure 4:
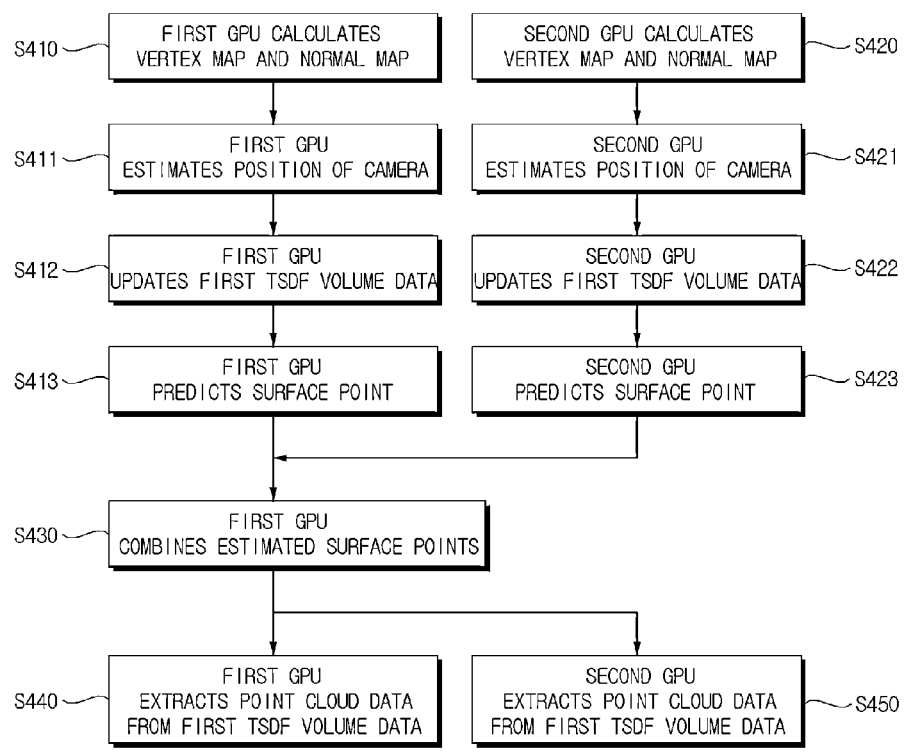
FIG. 4 is a first view illustrating a method for 3D reconstruction according to an exemplary embodiment of the present invention.

FIG. 4 is a first view illustrating a method for 3D reconstruction according to an exemplary embodiment of the present invention.

As illustrated in FIG. 4, in step S410, the first GPU according to the exemplary embodiment receives first depth data generated from the camera for the first area and calculates a vertex map and a normal map from the received first depth data.

Next, in step S411, the first GPU estimates a position of the camera based on the calculated vertex map and normal map and in step S412, updates the first TSDF volume data with the first depth data based on the estimated position of the camera.

Next, in step S413, the first GPU predicts a surface point of an object which is present in a current space from the first updated TSDF volume data using a ray casting algorithm.

In step S420, the second GPU receives second depth data generated from the camera for the second area and calculates a vertex map and a normal map from the received second depth data.

Next, in step S421, the second GPU estimates a position of the camera based on the calculated vertex map and normal map and in step S422, updates the second TSDF volume data with the second depth data based on the estimated position of the camera.

Next, in step S423, the second GPU predicts a surface point of the object which is present in the current space from the second updated TSDF volume data using a ray casting algorithm.

Next, in step S430, if the first TSDF volume data and the second TSDF volume data are completely updated in accordance with the all positions of the camera, the first GPU combines a surface point predicted from the updated first TSDF volume data and a surface point estimated from the second TSDF volume data.

Next, in step S440, the first GPU extracts point cloud data corresponding to the surface coordinate of the object which is present in the space from the first TSDF volume data to which the combined result is applied.

Further, in step S450, the second GPU extracts point cloud data corresponding to a surface coordinate of an object which is present in a space from the second TSDF volume data to which the combined result is applied.

As described above, if the point cloud data extracted from the first GPU and the second GPU is combined, point cloud data for entire areas to be reconstructed is generated.

Figure 5:
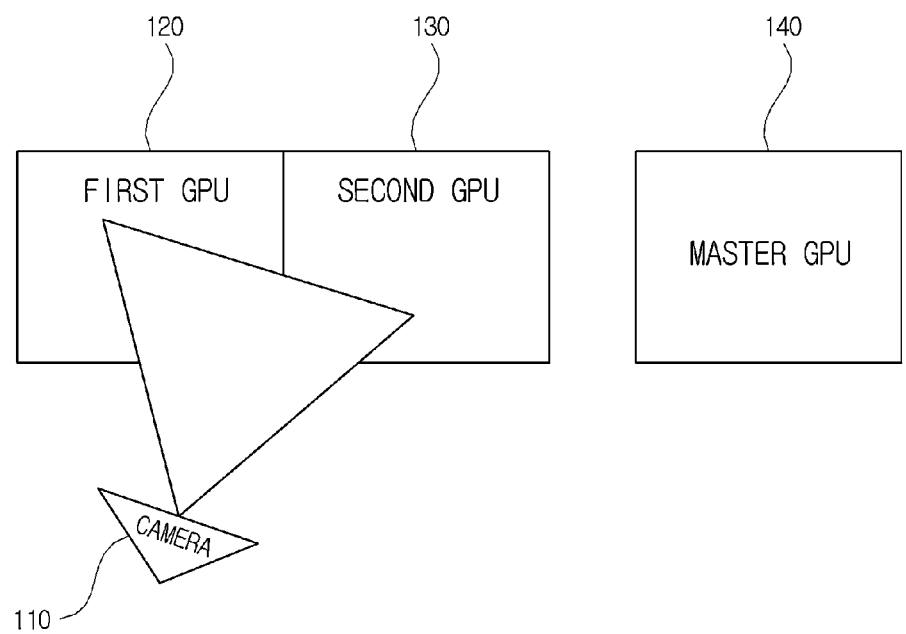
FIG. 5 is a second view illustrating an apparatus for 3D reconstruction according to an exemplary embodiment of the present invention.

FIG. 5 is a second view illustrating an apparatus for 3D reconstruction according to an exemplary embodiment of the present invention.

As illustrated in FIG. 5, the apparatus for 3D space reconstruction according to the exemplary embodiment of the present invention includes a camera 110, a first GPU 120, a second GPU 130, and a master GPU 140. A 3D reconstruction method using three GPUs will be described.

The camera 110 is an RGBD camera and generates depth data with respect to a space.

The first GPU 120 updates first TSDF (truncated signed distance function) volume data with first depth data based on a position of the camera estimated from the master GPU 140.

The first GPU 120 predicts a surface point of an object which is present in a current space from the first updated TSDF volume data using a ray casting algorithm.

In this case, the first GPU 120 updates the first TSDF volume data in accordance with the all positions of the camera.

The first GPU 120 extracts point cloud data corresponding to the surface coordinate of the object which is present in the space from the first TSDF volume data to which the combined result is applied.

The second GPU 130 updates a second TSDF (truncated signed distance function) volume data with a second depth data based on a position of the camera estimated from the master GPU 140.

The second GPU 130 predicts a surface point of an object which is present in a current space from the first TSDF volume data updated using a ray casting algorithm.

In this case, the second GPU 130 updates the first TSDF volume data in accordance with the all positions of the camera.

The second GPU 130 extracts point cloud data corresponding to a surface coordinate of an object which is present in a space from the second TSDF volume data to which the combined result is applied.

The master GPU 140 receives first depth data generated from the camera 110 for the first area and second depth data generated from the camera 110 for the second area and calculates the vertex map and the normal map from the received first and second depth data.

The master GPU 140 may estimate a position of the camera using an ICP (Iterative closest point) alignment method based on the calculated vertex map and normal map.

In this case, if the TSDF volume data of the first area which is processed by the first GPU 120 is smaller than TSDF volume data of a third area which is not processed by the first GPU 120, the master GPU 140 controls the first GPU 120 to process the third area.

If update is completed in accordance with all positions of the camera, the master GPU 140 combines a surface point predicted from the first TSDF volume data updated in the first GPU 120 and a surface point estimated from the second TSDF volume data updated in the second GPU 130.

Figure 6A:
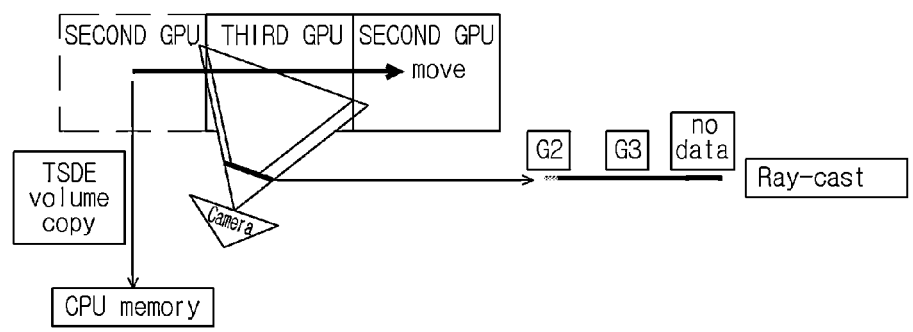
FIGS. 6A and 6B are view explaining a principle which changes a reconstruction area according to the exemplary embodiment.
Figure 6B:
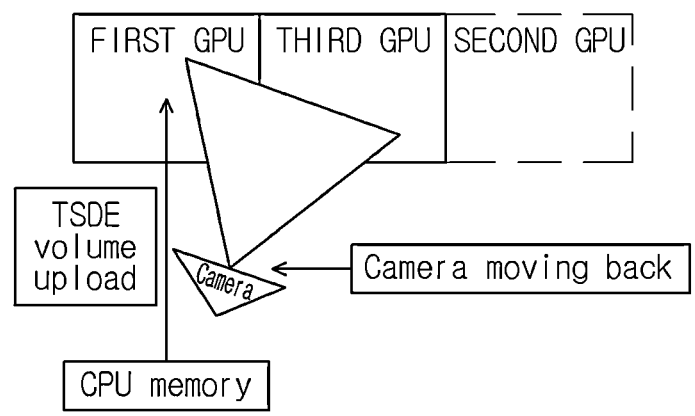

FIGS. 6A and 6B are view explaining a principle which changes a reconstruction area according to the exemplary embodiment.

As illustrated in FIG. 6A, the first GPU processes a new area. That is, if the TSDF volume data of the first area which is processed by the first GPU is smaller than TSDF volume data of a new third area which is not processed by the first GPU, the master GPU 140 controls the first GPU to process the third area in a direction where the camera moves.

In this case, the first GPU copies the TSDF data which is already collected before changing an area to be processed in a system memory. If a bandwidth of the first GPU is considered, a time to copy the data is shorter than a time to process one frame of data entering from the camera. This means that the first GPU loses the first data which will be newly processed but does not affect a next process of the first GPU.

FIG. 6B illustrates that the first GPU returns an area which is previously processed by the camera. That is, the first GPU reads out TSDF data of the corresponding area which is stored in the system memory.

The method dynamically changes an area which is processed by the GPU while moving the camera as described above, so that the reconstruction area expand and there is no limitation on a size of the reconstruction area.

Figure 7:
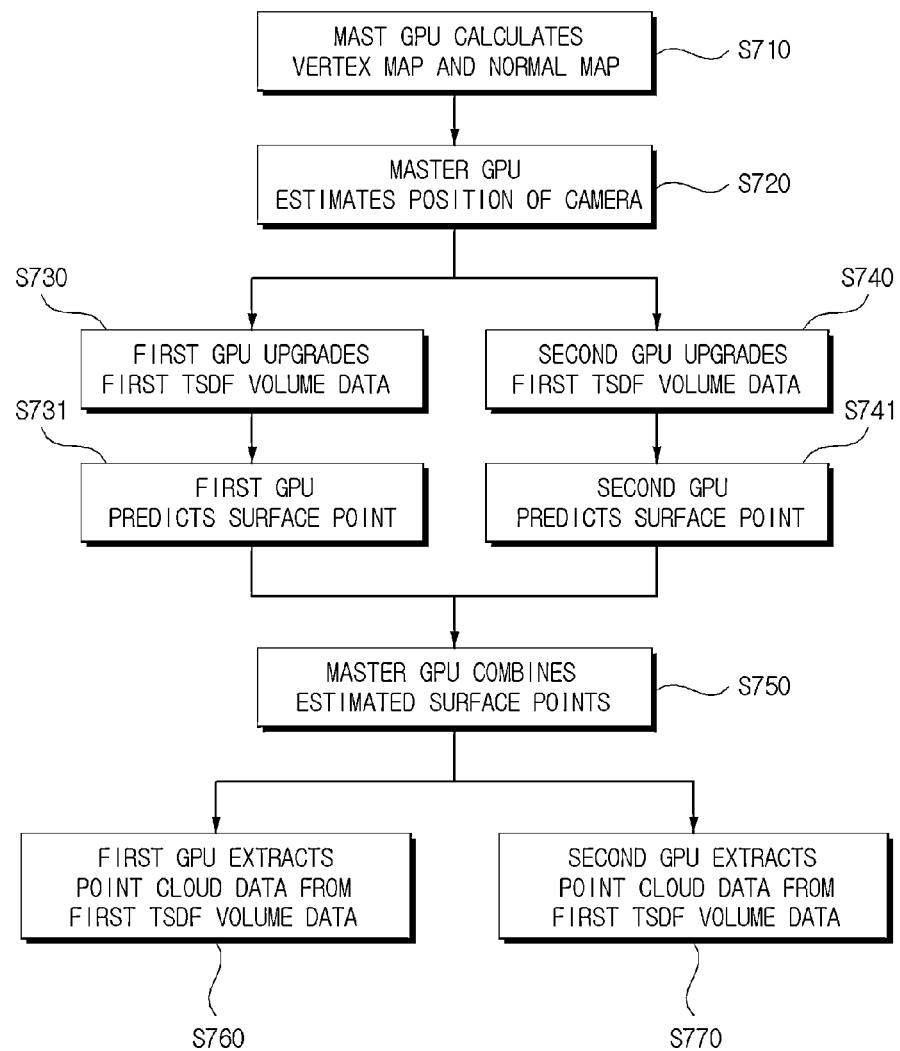
FIG. 7 is a second view illustrating a method for 3D reconstruction according to an exemplary embodiment of the present invention.

FIG. 7 is a second view illustrating a method for 3D reconstruction according to an exemplary embodiment of the present invention.

As illustrated in FIG. 7, in step S710, the master GPU according to the exemplary embodiment receives first depth data generated from the camera for the first area and second depth data generated from the camera for the second area and calculates the vertex map and the normal map from the received first and second depth data.

Next, in step S720, the master GPU estimates the position of the camera based on the calculated vertex map and normal map.

Next, in step S730, the first GPU updates the first TSDF volume data with the first depth data based on the estimated position of the camera and in step S731, predicts a surface point of an object which is present in a current space from the first updated TSDF volume data using the ray casting algorithm.

Further, in step S740, the second GPU updates the first TSDF volume data with the second depth data based on the estimated position of the camera and in step S741, predicts a surface point of an object which is present in a current space from the second updated TSDF volume data using the ray casting algorithm.

Next, in step S750, if the first TSDF volume data and the second TSDF volume data are completely updated in accordance with all positions of the camera, the master GPU combines a surface point predicted from the updated first TSDF volume data and a surface point predicted from the second TSDF volume data.

Next, in step S760, the first GPU extracts point cloud data corresponding to a surface coordinate of an object which is present in a space from the first TSDF volume data to which the combined result is applied.

Further, in step S770, the second GPU extracts point cloud data corresponding to a surface coordinate of an object which is present in a space from the second TSDF volume data to which the combined result is applied.

As described above, if the point cloud data extracted from the first GPU and the second GPU is combined, point cloud data for entire areas to be reconstructed is generated.

Even though all components of the exemplary embodiment may be combined as one component or operates to be combined, the present invention is not limited to the exemplary embodiment. In other words, all components may be selectively combined to be operated within a scope of the present invention. Further, all components may be implemented as one independent hardware but a part or all of the components are selectively combined to be implemented as a computer program which includes a program module which performs a part or all functions combined in one or plural hardwares. Further, such a computer program may be stored in a computer readable media such as a USB memory, a CD disk, or a flash memory to be read and executed by a computer to implement the exemplary embodiment of the present invention. The storage media of the computer program may include a magnetic recording medium, an optical recording medium, or a carrier wave medium.

The exemplary embodiments of the present invention which have been described above are examples and it is obvious to those skilled in the art that various changes or modifications may be made without departing from the spirit and scope of the present invention. Accordingly, the various exemplary embodiments disclosed herein are not intended to limit the technical spirit but describe with the true scope and spirit being indicated by the following claims. The scope of the present invention may be interpreted by the appended claims and the technical spirit in the equivalent range is intended to be embraced by the invention.

What is claimed is:

1. A three-dimensional (3D) reconstruction apparatus, comprising:
    a camera configured to generate depth data to reconstruct a 3D space;
    a first graphic processing unit (GPU) configured to
        update first truncated signed distance function (TSDF) volume data with first depth data generated with respect to a first area, and
        predict a first surface point of at least one object present in the 3D space based on the updated first TSDF volume data;
    a second GPU configured to
        update second TSDF volume data with second depth data generated with respect to a second area, and
        predict a second surface point of the at least one object present in the 3D space based on the updated second TSDF volume data; and
    a master GPU configured to combine the first surface point predicted based on the first TSDF volume data and the second surface point predicted based on the second TSDF volume data, in response to the first TSDF volume data and the second TSDF volume data being updated with respect to a changed position of the camera.

2. The apparatus of claim 1, wherein the master GPU is further configured to
    receive first depth data generated by the camera with respect to the first area,
    receive second depth data generated by the camera with respect to the second area,
    calculate a vertex map and a normal map based on the received first and second depth data, and
    estimate a position of the camera based on the calculated vertex map and normal map.

3. The apparatus of claim 2, wherein the first GPU is configured to
    update the first TSDF volume data with the first depth data based on the estimated position of the camera, and predict the first surface point of the at least one object present in the 3D space based on the updated first TSDF volume data and a ray casting algorithm.

4. The apparatus of claim 2, the second GPU is further configured to
update the second TSDF volume data with the second depth data based on the estimated position of the camera, and
predict the second surface point of the at least one object present in a space based on the updated second TSDF volume data and a ray casting algorithm.

5. The apparatus of claim 1, wherein the first GPU is further configured to
extract first point cloud data corresponding to a first surface coordinate of the at least one object present in the 3D space based on the first TSDF volume data, the combined result of the first and second surface points being applied to the extracted first point cloud data.

6. The apparatus of claim 1, wherein the second GPU is further configured to extract point cloud data corresponding to a second surface coordinate of the at least one object present in the 3D space based on the second TSDF volume data, the combined result of the first and second points being applied to the extracted second point cloud data.

7. The apparatus of claim 1, wherein the master GPU is further configured to control the first GPU to process a third area in response to the first TSDF volume data processed by the first GPU being smaller than third TSDF volume data of the third area.

8. The apparatus of claim 1, wherein the master GPU is further configured to control the first GPU to process a third area in response to the first TSDF volume data processed by the first GPU being smaller than third TSDF volume data of the third area and the camera being moved in a new direction.

9. A three-dimensional (3D) reconstruction method, comprising:
generating depth data to reconstruct a 3D space with a camera;
updating, by a first graphic processing unit (CPU), first truncated signed distance function (TSDF) volume data with first depth data generated with respect to a first area;
predicting, by the first GPU, a first surface point of at least one object present in the 3D space based on the updated first TSDF volume data;
updating, by a second GPU, second TSDF volume data with second depth data generated with respect to a second area;
predicting, by the second GPU, a second surface point of the at least one object present in the 3D space based on the updated second TSDF volume data; and
combining, by a master GPU, the first surface point predicted based on the first TSDF volume data and the second surface point predicted based on the second TSDF volume data, in response to the first TSDF volume data and the second TSDF volume data being updated with respect to a changed position of the camera.

10. The method of claim 9, further comprising:
receiving, at the master GPU first depth data generated by the camera with respect to the first area;
receiving, at the master GPU, second depth data generated by the camera with respect to the second area;
calculating, by the master GPU, a vertex map and a normal map based on the received first and second depth data; and
estimating, by the master GPU, a position of the camera based on the calculated vertex map and normal map.

11. The method of claim 10, wherein the predicting, by the first GPU, of the first surface point of the at least one object present in the 3D space based on the updated first TSDF volume data comprises:
updating, by the first GPU, the first TSDF volume data with the first depth data based on the estimated position of the camera, and
predicting, by the first GPU, the first surface point of the at least one object present in the 3D space based on the updated first TSDF volume data and a ray casting algorithm.

12. The method of claim 10, wherein the predicting, by the second GPU, of the second surface point of the at least one object present in the 3D space based on the updated second TSDF volume data comprises:
updating, by the second GPU, the second TSDF volume data with the second depth data based on the estimated position of the camera, and
predicting, by the second GPU, the second surface point of the at least one object present in the 3D space based on the updated second TSDF volume data and a ray casting algorithm.

13. The method of claim 9, further comprising:
extracting, by the first GPU, first point cloud data corresponding to a first surface coordinate of the at least one object present in the 3D space based on the first TSDF volume data, the combined result of the first and second surface points being applied to the extracted first point could data.

14. The method of claim 9, further comprising:
extracting by the second GPU, second point cloud data corresponding to a second surface coordinate of the at least one object present in the 3D space based on the second TSDF volume data, the combined result of the first and second surface points being applied to the extracted second point cloud data.

15. The method of claim 9, further comprising
controlling, by the master GPU, the first GPU to process a third area in response to the first TSDF volume data processed by the first GPU being smaller than third TSDF volume data of the third area.

16. A non-transitory computer-readable storage medium having stored therein program instructions to cause a processor to implement the method of claim 9.

* * * * *